INVENTOR
C. E. McRee

Oct. 2, 1962
C. E. McREE
3,056,267
METHOD AND APPARATUS FOR REMOVING FROM SUBMERGED
SITES PORTIONS OF PREVIOUSLY DRIVEN PILES
Filed Oct. 24, 1961
5 Sheets-Sheet 2

INVENTOR
C. E. McRee

BY
Wilkinson, Mawhinney & Theibault
ATTORNEYS

Oct. 2, 1962 C. E. McREE 3,056,267
METHOD AND APPARATUS FOR REMOVING FROM SUBMERGED
SITES PORTIONS OF PREVIOUSLY DRIVEN PILES
Filed Oct. 24, 1961 5 Sheets-Sheet 3

INVENTOR
C. E. McRee

BY
Wilkinson, Mawhinney & Theibault
ATTORNEYS

Oct. 2, 1962 C. E. McREE 3,056,267
METHOD AND APPARATUS FOR REMOVING FROM SUBMERGED
SITES PORTIONS OF PREVIOUSLY DRIVEN PILES
Filed Oct. 24, 1961 5 Sheets-Sheet 4

INVENTOR
C. E. McRee

BY Wilkinson, Mawhinney & Theibault
ATTORNEYS

Oct. 2, 1962 C. E. McREE 3,056,267
METHOD AND APPARATUS FOR REMOVING FROM SUBMERGED
SITES PORTIONS OF PREVIOUSLY DRIVEN PILES
Filed Oct. 24, 1961 5 Sheets-Sheet 5

INVENTOR
C. E. McRee

BY
Wilkinson, Mawhinney & Theibault
ATTORNEYS

United States Patent Office 3,056,267
Patented Oct. 2, 1962

3,056,267
METHOD AND APPARATUS FOR REMOVING FROM SUBMERGED SITES PORTIONS OF PREVIOUSLY DRIVEN PILES
Clarence E. McRee, Columbus, Ga., assignor to Columbus Construction Company, Columbus, Ga., a corporation of Georgia
Filed Oct. 24, 1961, Ser. No. 147,330
8 Claims. (Cl. 61—53.5)

The present invention relates to method and apparatus for removing from submerged sites portions of previously driven piles.

In removing previously driven piling which projects into either a stream bed, mud stratum or any other marine base into which the piling has previously been driven whereby a portion of the piling has taken purchase with the bed of a stream, river, ocean or any water body bordering on a navigable body of water, several methods have been proposed in the past all of which are costly for the following reasons.

When removing the piling, it must be removed at least at the mud line to leave the stream navigable and heretofore these pilings have had to be lassoed and pulled up from their purchase with the marine floor into which they project and this process of lassoing and pulling necessitated a 100-ton crane with an eight-part line. The approximate cost per pile to pull as just described ran from $12.00 to $20.00 per pile. The lassoing operation required additional auxiliary vessels such as barges and tugs.

Another form of removing pilings other than lassoing and pulling has been to saw or cut the piling at mud level with the use of divers. Some diving activities for the removal of piling also employed the use of explosives which the divers placed on the pilings and after removal of the diver from the area the charge was detonated. The cost involved with the use of divers was generally about $25.00 an hour for the diver and $6.00 an hour for the diver's tender. The submerged working time of a diver is limited. Whether he is sawing or placing charges he will only work an effective three hours out of an eight-hour work day.

When employing the pile cutting device of the present invention the cost of removing piles can be dropped to $2.00 per pile and as many as 210 piles have been cut and removed in a ten-hour day in accordance with the present invention.

The method of the instant invention contemplates the removal from submerged sites portions of piles extending above the lower ends thereof which have been driven into the water bed and which generally pass through a mud stratum in which a weighted cutting frame having a vertical opening therethrough is swung to a horizontal position with the opening poised above the pile and the weighted frame is then allowed to drop by gravity threading the cap end of the pile through the opening of the weighted frame and allowing the weighted frame to settle to the mud stratum, at which time a mechanical severing means carried by the weighted frame shears the pile transversely of its major axis and the piling having been then severed at the mud line, the severed portion thereof is removed from the area leaving the area once again navigable and useful.

Another object of the present invention is the provision of a method of removing from submerged sites upper portions of piles extending above the lower ends thereof which have been driven into a water bed which comprises severing by a mechanical shear the piles at the submerged points above the water bed and withdrawing from the site the severed upper portion of the piles to eliminate navigational hazards.

A further object of the present invention is to provide an apparatus for removing previously driven piling, which apparatus is provided with a weighted frame member having an opening therethrough of a diameter greater than the greatest diameter of a pile to be served and having a pair of relatively movable cutter members carried by the weighted frame and located, when moved, to a closed position to close the opening in the weighted frame and to sever the piling at the mud stratum, which cutter members are actuated toward one another to cut the piling by a shearing or guillotine action and which, since the weighted frame will be submerged, may be actuated from a remote position above the submerged area and controlled hydraulically from a boat, barge, pier or the like.

With the foregoing and other objects in view, the invention will be more fully described hereinafter, and will be more particularly pointed out in the claims appended hereto.

In the drawings, wherein like symbols refer to like or corresponding parts throughout the several views.

Figure 1:
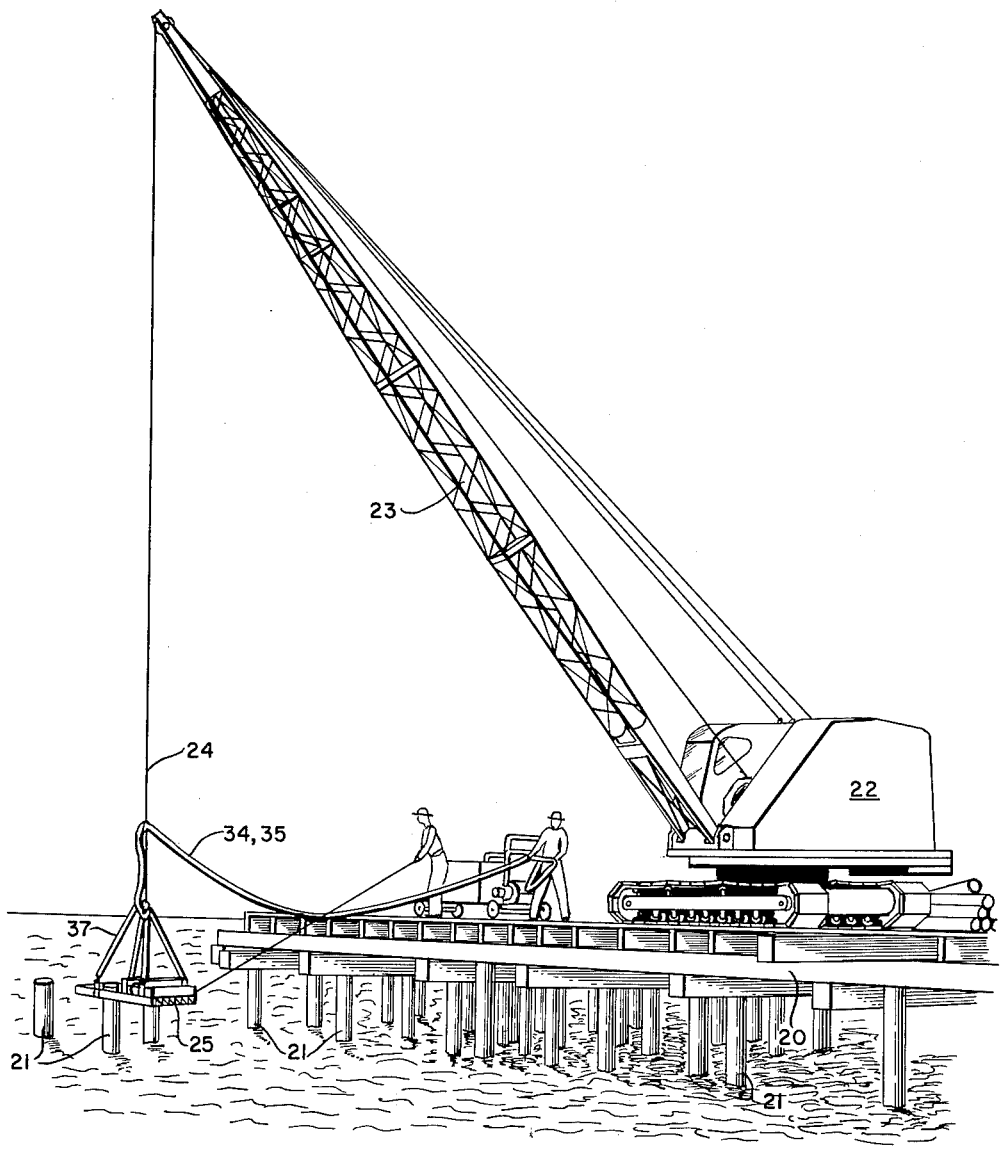
FIGURE 1 is a perspective view of a pile removing operation showing the method and apparatus of the present invention wherein the weighted frame for severing the piles is shown poised above a pile to be removed.

Referring to FIGURE 1, 20 designates a pier supported on piling 21, which pier is being removed and as removal of the pier progresses toward land the pilings exposed by removal of the support structure for the pier are then severed at the mud line in accordance with the method and apparatus of the present invention.

A drag line 22 is shown with its boom 23 swung out toward exposed pilings, and secured to the hoist cable 24 of the drag line is the weighted frame 25 of the present invention. The drag line operator poises the weighted frame 25, as best shown in FIGURE 1, above the cap end of an exposed piling 21 and then permits the unit by gravity to descend threading the cap end of the piling through the opening of the weighted frame. The weighted frame 25, as shown in FIGURES 2 through 5 inclusive, has an opening 26 the diameter of which is greater than the maximum diameter of any piling to be sheared by the device whereby the weighted frame may thread the cap end of the piling 21 through the opening 26 in the manner shown in FIGURE 2.

Secured above the opening at one side thereof is a stationary cutter blade 27, and cooperating with the stationary cutter blade 27 is a movable cutter blade 28. The stationary cutter blade 27 has an arcuate recess 27a while the movable cutter blade 28 has a semi-parabolic recess 28ª. The stationary blade 27 may be bolted in place in the weighted frame whereby should any accident occur to the stationary blade this member may be readily replaced at the site. The movable cutter blade 28 is also bolted to a slide member 29 which has secured thereto a crosshead 30 which is pivotally connected to and driven by a ram 31 which receives its driving power from a hydraulic cylinder 32. The hydraulic cylinder 32 is rigidly anchored to the weighted frame 25 as by a pivotal connection 33. The hydraulic cylinder 32 receives its motive fluid through lines 34, 35 as will be described more fully hereinafter.

Located at a number of points about the top of the weighted frame 25, being welded thereto, are pad eyes 36 to which are anchored the harness members 37 which join a support ring 38 which is connected to the cable 24 of the drag line as by a clevis, clamp or the like 39.

It will be noted with respect to the center longitudinal axis of the weighted frame 25 that the hydraulic cylinder 32 and its ram 31 are located off the center line. In the form of invention disclosed this arrangement is to be preferred in view of the following conditions.

Figure 2:
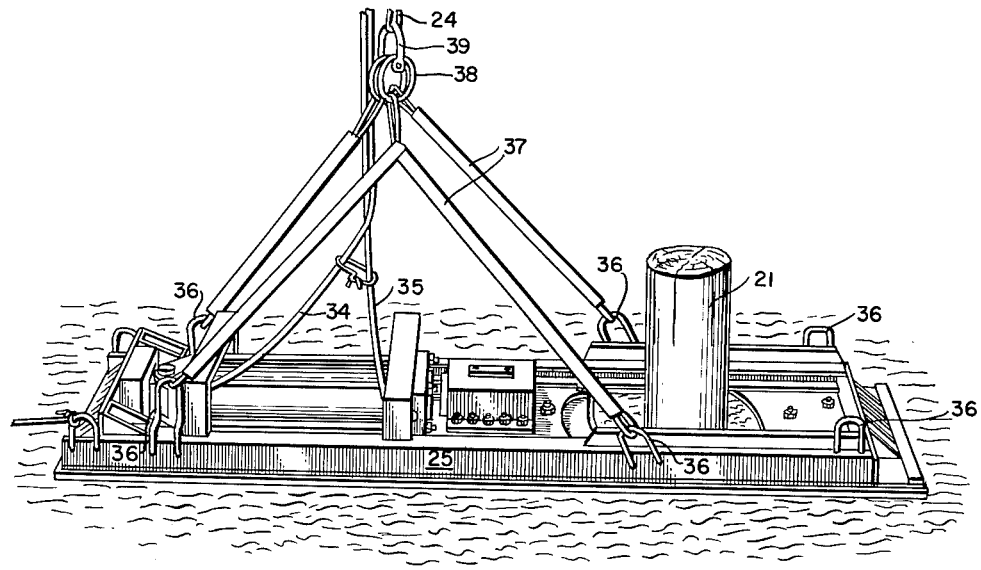
FIGURE 2 is a perspective view of one form of apparatus of the present invention showing the weighted frame being threaded over the cap end of a pile to be severed.

Piling generally is larger at its top or cap end than it is at the bottom. As by way of example, a piling may have a twenty inch diameter cap but over a length of thirty feet that piling will taper to only a sixteen inch diameter, the four inch taper being distributed over the thirty foot length. When the piling cutting device of the present invention is threaded over the cap end of a pile, as shown in FIGURE 2 and for example the piling 21 in FIGURE 2 has a cap diameter of twenty inches, the opening 26 in the bottom of the weighted frame must exceed the cap diameter of twenty inches; but when the unit 25 is lowered upon the piling and down along the length of the piling the diameter of the piling is effectively being diminished so that when the frame comes to rest upon the mud bed or bottom the effective diameter of the piling to be cut at this point is only sixteen inches. The distance to the center line of the sixteen inch piling would of course be eight inches. If the maximum diameter of the opening 26 were twenty-two inches the center line of twenty-two inches would be eleven inches whereas the actual diameter of the piling being cut has a center of only eight inches. This immediately shows a three inch variance and this also shows that the line of thrust of the cylinder and ram would not be on the center line of the sixteen inch diameter piling to be cut.

Figure 3:
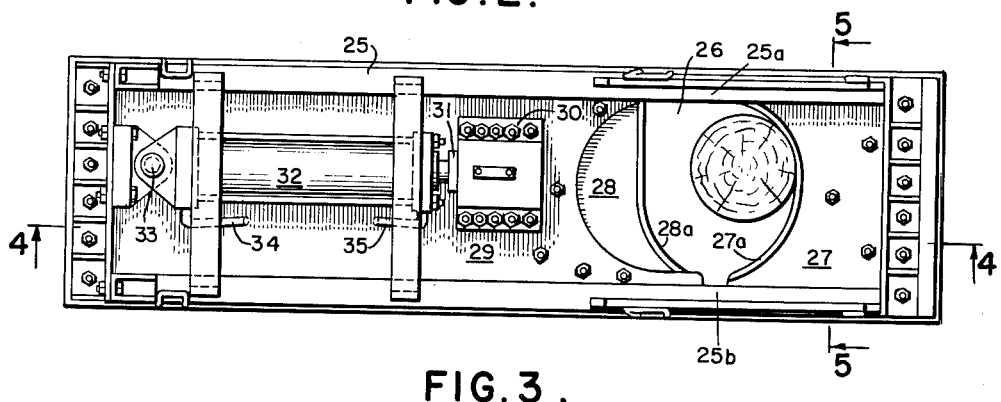
FIGURE 3 is a top plan view of the form of device of FIGURE 2.
Figure 4:
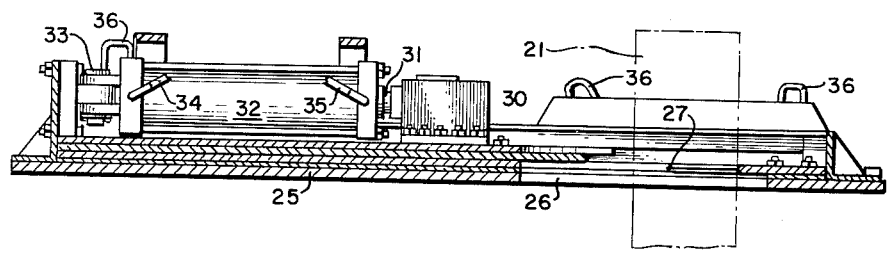
FIGURE 4 is a longitudinal section taken on the line 4—4 in FIGURE 3.
Figure 5:
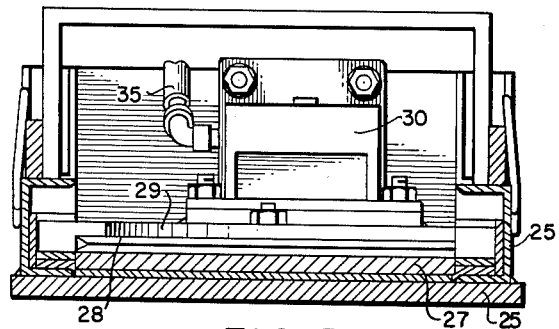
FIGURE 5 is a transverse section taken on the line 5—5 in FIGURE 3.

The movable cutter blade 28 having a semi-parabolic recessed blade at 28ª upon actuation of the hydraulic cylinder 32 and upon the blade 28 approaching the blade 27, the piling will be urged as shown in FIGURE 3 upwardly to one side of the center line of the weighted frame 25. This is to more nearly bring the portion of the piling to be severed to the center line of thrust of the cylinder and ram 32, 31.

The curvature of the cutting blades is selected to urge the piling to one side of the unit, which side is away from the taper of the cutting blade. If the cylinder and ram were located truly on the center line of the major axis of the weighted frame 25, this would be the ideal situation for cutting only one side of pile which would have to have the same diameter along its entire length in order to assure center line thrust.

Figure 6:
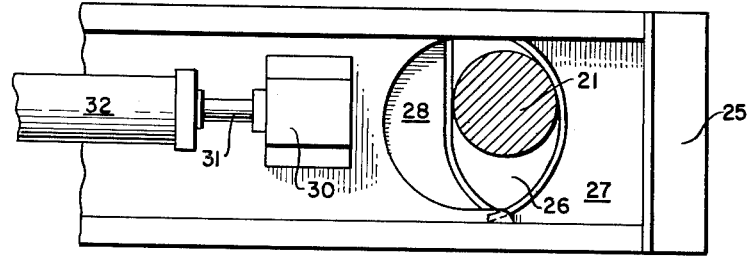
FIGURES 6 through 8 are schematics showing the phases of operation of the device in severing a pile.

As shown in FIGURE 6 the cylinder 32 is driving the ram 31, its crosshead 30 and its entrained movable blade 28 in the direction toward the piling 21 and is causing the piling to be sheared between the movable blade 28 and the stationary blade 27.

Figure 7:
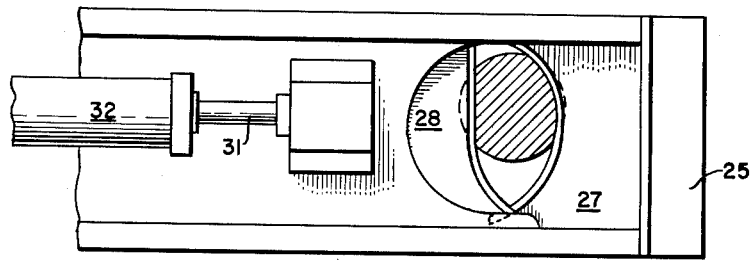

FIGURE 7 is a view similar to FIGURE 6 which shows the piling 21 partially severed upon the further travel of the ram 31 and its connected movable cutter blade 28.

Figure 8:
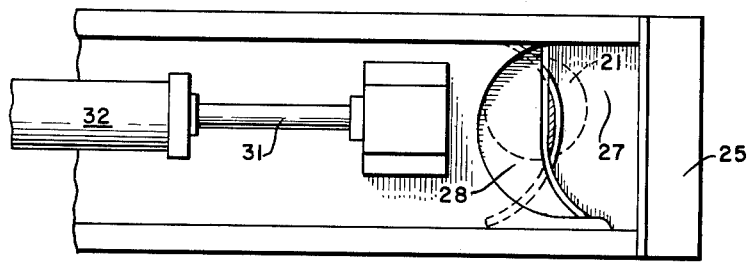

FIGURE 8 being similar to FIGURES 6 and 7 shows the ram 31 having traveled just short of a selected maximum distance and the blade 28 having cooperated with the stationary blade 27 to completely shear or sever the piling 21.

The unit shown in FIGURES 2 through 5 inclusive weighs approximately 4,000 pounds and is designed heavy so as to drop quickly below the surface level and to actually enter the mud or soft water bed. The unit may also be provided with jet nozzles to cause turbulence in the mud to permit the weighted frame 25 to actually sink below the mud line when it is desired to sever the piling slightly below the mud line.

Figure 10:
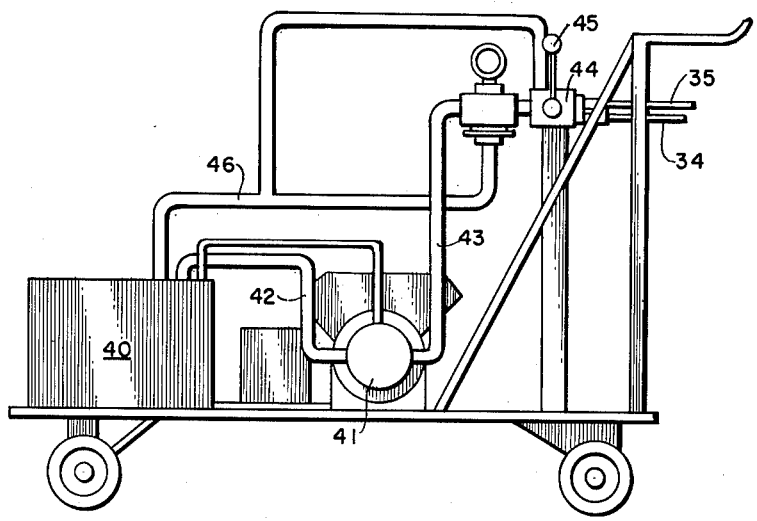
FIGURE 10 is a side elevational view of a portable hydraulic unit which may be employed as the operating source of motive fluid of the device of the present invention.
Figure 11:
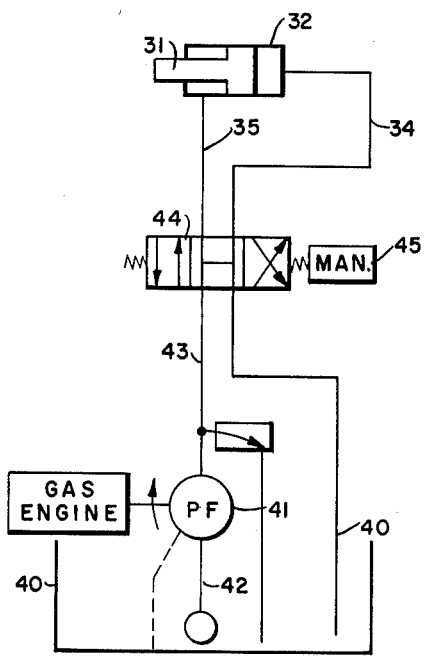
FIGURE 11 is a hydraulic schematic of the apparatus and control means of the present invention.

The stationary blade 27 and movable blade 28 which comprise the relatively movable cutter members may be bevelled on either or both sides to increase their cutting efficiency. The hydraulic cylinder 32 and its ram 31 comprise a cutter actuating means and the remote control means for actuating the cutter actuating means may consist, for example as shown in FIGURE 10, of a hydraulic reesrvoir 40 containing a hydraulic fluid which is pressurized by a gasoline driven pump 41, drawing the fluid through a line 42 from the reservoir to the pump and discharging the fluid from the pump 41 from a line 43 to an operating valve 44 having an operating lever 45. The valve 44 controls the supply of fluid to the hydraulic lines 34, 35. The return leg of the hydraulic circuit is shown at 46 returning to the reservoir.

Figure 9:
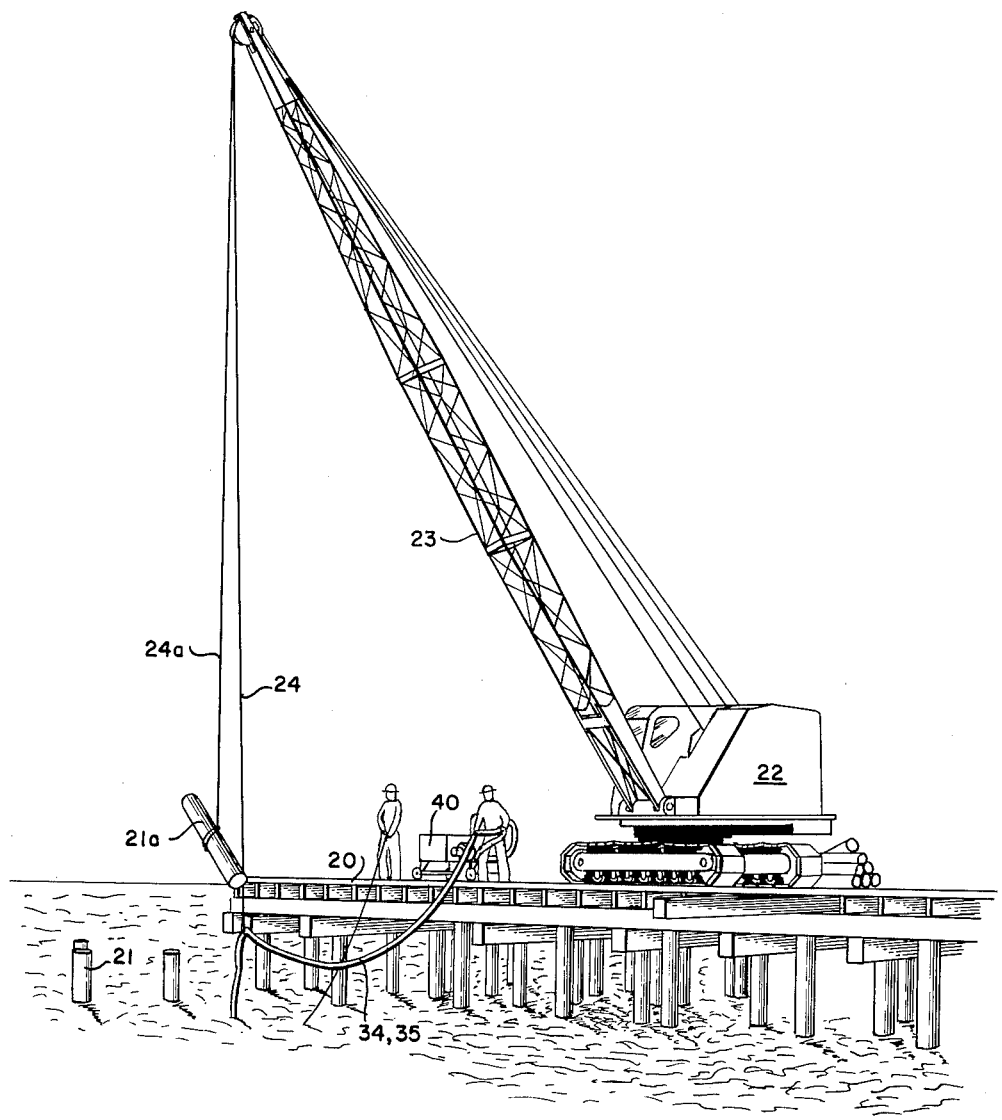
FIGURE 9 is a perspective view of a pile removing operation in accordance with the present invention showing the removal of a severed pile which has been severed by the method and apparatus of the present invention.

It will be noted that, as shown in FIGURES 1 and 9, the hydraulic unit for supplying motive fluid to the weighted frame is a separate mobile unit sitting on the pier 20 and that the hydraulic lines are attended by one man while a second man attends a guide line for assisting in guiding the weighted frame 25 to proper registry of its opening 26 with a cap end of an exposed pile.

It will be appreciated that the hydraulic unit can be simplified and actually a pump can be placed on the power take-off of the engine of the drag line and the operating valve 44 and its lever 45 may be placed right on the console of the drag line so that a single operator may operate both the drag line and the pile cutting device. Automatic take-up reels may be provided for the hydraulic lines that run out to the weighted frame member 25 thereby eliminating one of the two men standing on the pier 20.

When carrying out the method of the present invention the drag line operator swings the boom 23 out toward the exposed cap end of pilings, as shown in FIGURE 1, in such a manner that the opening 26 in the weighted frame 25 is poised over the cap end of a piling 21. When the cable 24 of the drag line is payed out the weighted frame 25 by gravity will pass over the pile 21 and down into the water until it rests on the bottom. A man then passes a severed pile retrieving line 24ª about the piling for purposes of removing the piling after it has been severed by the pile cutting device of the present invention.

One of the dock operators shown in FIGURES 1 and 9 then actuates the lever 45 to control valve 44 sending pressurized fluid to the cylinder 32 through lines 34, 35 causing the ram 31 to be driven away from the cylinder and forcing the movable cutting blade 28 toward the stationary blade 27 in the manner shown in FIGURES 6 through 8 inclusive to thereby sever the pile.

When the pile cutting device of the present invention has completely severed the pile as in its FIGURE 8 position, the drag line operator then takes up on line 24ª and swings the severed portion of the pile 21ª over to a vehicle for transport away from the dock area. The drag line operator then takes up on cable 24 raising the weighted frame member 25 to the surface and he then swings it over another pile and continues the above-described operations until all of the exposed pilings have been severed and removed from the area.

It will be appreciated that the pile cutter of the present invention is not restrictive in its operating depth but it may cut piles forty or fifty feet below the surface of the water. The pile cutter of the instant invention may also be used to cut a line and grade piles for bridges where pilings are submerged.

One of the further advantages of locating the center line of the ram for actuating the movable cutter blade to one side of the weighted frame member as distinguished from placing the center line of the ram on the center line of the frame is to so position the center line of thrust of the movable cutter blade so that the framework will go down over piling which has as little as four inches of clearance between pilings. When this is done the center line of the ram and cylinder are so located as to cut on the center line of pilings which have an average diameter of sixteen inches.

I do not restrict the use of this invention to cutting wood piles alone, but would state that where the wood pile is used other materials other than wood which have a free and unobstructed end over which the weighted frame may be threaded may be worked upon by this invention. By changing the hardness of the blades such material as concrete, iron and steel may be as readily sheared as can wood.

This invention will also work upon piles that are not immersed in water but may be employed over any upstanding device which has been embedded in the surface, the cap end of the exposed device being of a lesser diameter than the opening of the weighted frame which is threaded over the projection to be cut.

Where I have used the wood piling in the claims, I reserve the right to such other projections which are embedded in the surface of the earth and which have the characteristics of a piling.

It will be appreciated that the device includes cutting means which comprises at least one blade 28 having a cutting edge 28ᵃ and that this cutting means is mounted in a support means which is that part of the frame 25 in which the blade 28 is guided in its forward and rearward strokes, and that there is also pile encircling means which as illustrated in FIGURE 3 comprises the cross member or blade 27 extending across the far side of the pile and includes also opposed lateral members 25ᵃ and 25ᵇ which flank the pile on opposite sides and as a matter of fact form extensions of the side rails of the frame 25. The pile encircling means, of course, includes the cutting blade 28. Thus the opening 26 is freely open in a vertical direction when the device is in the operative position of FIGURES 1 and 2 where the frame 25 is horizontally disposed with reference to its flat thin dimensions. Also, the opening 26 is closed all around by the parts 28, 25ᵃ, 25ᵇ and 27. Where this construction and arrangement prevail, the suspension means 37 must be so arranged and disposed and so connected to the frame that the frame will be oriented with its opening 26 is substantially the vertical direction whereby lowering of the device over the cap end of the pile 21 will enable the device to descend by the force of gravity both through the air and water media to a selected low position along the length of the pile to that subemrged part where it is desired to cut through the same.

With this arrangement the device becomes captive to the pile and the pile thus guides the device to the area of severances. Thus lateral drift of the device below the water line is avoided which would otherwise in all probability take place due to current and tide conditions. The threading of the pile to the device takes place above water line within full visibility of the operating crew. The weight mass embodied in the frame is calculated to insure prompt substantially right line descent of the device to the incision level.

Although I have disclosed herein the best forms of the invention known to me at this time, I reserve the right to all such modifications and changes as may come within the scope of the following claims.

What I claim is:

1. The method for removing from submerged sites portions of piles previously driven at their lower ends into the water bed and having cap ends exposed above the water line comprising (a) laterally shifting a cutting frame to a position poised above a pile with an opening through the frame in alignment with the cap end of the pile,
    (b) lowering the frame to thread the cap end of the pile through the opening thus making the frame captive to the pile,
    (c) guiding the frame by the pile in its further lowering movement until arrested on reaching the mud line,
    (d) severing the pile substantially at the mud line,
    (e) raising the frame through and above the water to a horizontal position above the pile cap line and
    (f) removing the severed portion of pile and repeating the cycle for other piles.

2. For use with a suspension means, an apparatus for removing from submerged sites portions of previously driven piles having cap ends exposed above the water line comprising (a) a frame having negative buoyancy weight mass,
    (b) pile-encircling means carried by said frame having an opening therethrough at least slightly larger than the diameter of the cap ends of the piles,
    (c) pile-cutting means in the frame movable across the opening to sever piles,
    (d) a motor in said frame connected to drive said pile-cutting means,
    (e) suspension receiving means on said frame adapted to be connected to said suspension means for supporting the frame with the opening substantially vertical to descend over and about the cap ends, with the
    (f) uncut fixed piles threaded through the opening to thereby
    (g) make the frame captive to the fixed piles,
    (h) said fixed piles also then acting to guide the frame downwardly thereabout substantially to the mud line where the frame is brought to rest, and
    (i) means adapted to be positioned above the water line and connected to the motor for triggering the latter into actuation of the pile-cutting means to sever the piles proximate the mud line.

3. An apparatus as claimed in claim 2 wherein said suspension receiving means is a balance sling connected to the frame at four load points and adapted to be connected to the suspension means to raise and lower said frame substantially horizontally.

4. An apparatus as claimed in claim 2 wherein said pile cutting means is a reciprocatable blade movable back and forth acros the opening to shear the piling.

5. An apparatus as claimed in claim 4 wherein said motor is a hydraulic cylinder and ram one of which is connected to the frame and the other of which is connected to drive the blade across the opening and through the piling.

6. An apparatus as claimed in claim 5 wherein said means adapted to be positioned above the water line and connected to the motor is a remote control valve in hydraulic circuitry with said cylinder and ram.

7. An apparatus as claimed in claim 6 wherein said hydraulic cylinder and ram have their axes of motion off center relative to the center line of the pile encircling opening in said frame.

8. An apparatus for removing from submerged sites portions of previously driven piles having cap ends exposed above the water line comprising (a) a frame having a negative buoyancy weight mass,
    (b) pile-encircling means carried by the frame having an opening therethrough at least slightly greater than the diameter of the cap ends of the piles,
    (c) pile-cutting means on the frame movable crosswise of the opening,
    (d) a motor on the frame connected to drive the pile-cutting means,
    (e) suspension means for supporting the frame in an orientation in which the opening is generally vertical, (f) lateral-motion means for the suspension means for horizontally shifting the frame to successive horizontal positions poised in air above the exposed cap ends of the piles with the frame opening in alignment with such cap ends,
(g) lowering means for the suspension means for lowering the frame when so poised to permit the frame to descend about the cap ends with the
(h) uncut fixed piles threaded through the opening to thereby
(i) make the frame captive to the fixed piles and not subject to motion of translation incident to drift or water currents,
(j) said fixed piles also then acting to guide the frame downwardly thereabout substantially to the mud line where the frame is automatically brought to rest,
(k) means adapted to be positioned above water line and connected to the motor for triggering the latter into actuation of the pile-cutting means,
(l) said frame being released from its captive relation to the pile on severing of the pile, and
(m) said suspension means thereupon adapted to lift the frame from the water subsequent to the cutting operation.

References Cited in the file of this patent
UNITED STATES PATENTS

| | | |
|---|---|---|
| 1,512,181 | Knechtel | Oct. 21, 1924 |
| 1,946,390 | Christiansen | Feb. 6, 1934 |
| 2,608,220 | Cauthen | Aug. 26, 1952 |
| 2,612,194 | Ingraham et al. | Sept. 30, 1952 |
| 2,766,525 | Hoffman | Oct. 16, 1956 |

FOREIGN PATENTS

| | | |
|---|---|---|
| 1,068 | Great Britain | Apr. 28, 1864 |
| 248,829 | Italy | June 18, 1926 |
| 49,816 | Netherlands | Jan. 15, 1941 |
| 24,652 | Finland | June 21, 1951 |